United States Patent [19]
Vogel et al.

[11] 4,084,117
[45] Apr. 11, 1978

[54] PROCEDURE FOR TIGHTENING TAPE WRAPS ON A SPINDLE

[75] Inventors: Stephen Martin Vogel, Boulder; John Walton Woods, Longmont, both of Colo.

[73] Assignee: International Business Machines Corporation, Armonk, N.Y.

[21] Appl. No.: 724,833

[22] Filed: Sep. 20, 1976

[51] Int. Cl.² .............................................. G05B 19/28
[52] U.S. Cl. ........................................ 318/6; 318/603
[58] Field of Search ............... 318/561, 6, 571, 603, 318/686; 242/55, 75.51, 186; 360/90, 134, 71

[56] References Cited

U.S. PATENT DOCUMENTS 3,730,450  5/1973  Hank ............................. 242/75.51 X
3,809,335  5/1974  Mantey ................................ 318/6 X
4,030,131  6/1977  Beiter et al. ................... 242/75.51 X Primary Examiner—Robert K. Schaefer
Assistant Examiner—John J. Feldhaus
Attorney, Agent, or Firm—Joscelyn G. Cockburn

[57] ABSTRACT

In a rotating head magnetic tape transport, magnetic media is transported from a supply spool to a take-up spool. Interlayer slippage, due to air entrapped between tape layers, is reduced by impressing a waveform on the take-up spool motor voltage during high speed search. The impressed waveform has a high acceleration component. As a result of the impressed waveform, a continual jerking action is imparted to the tape to squeeze out entrapped air and leave said tape in a state of tension or tightly wound.

16 Claims, 9 Drawing Figures

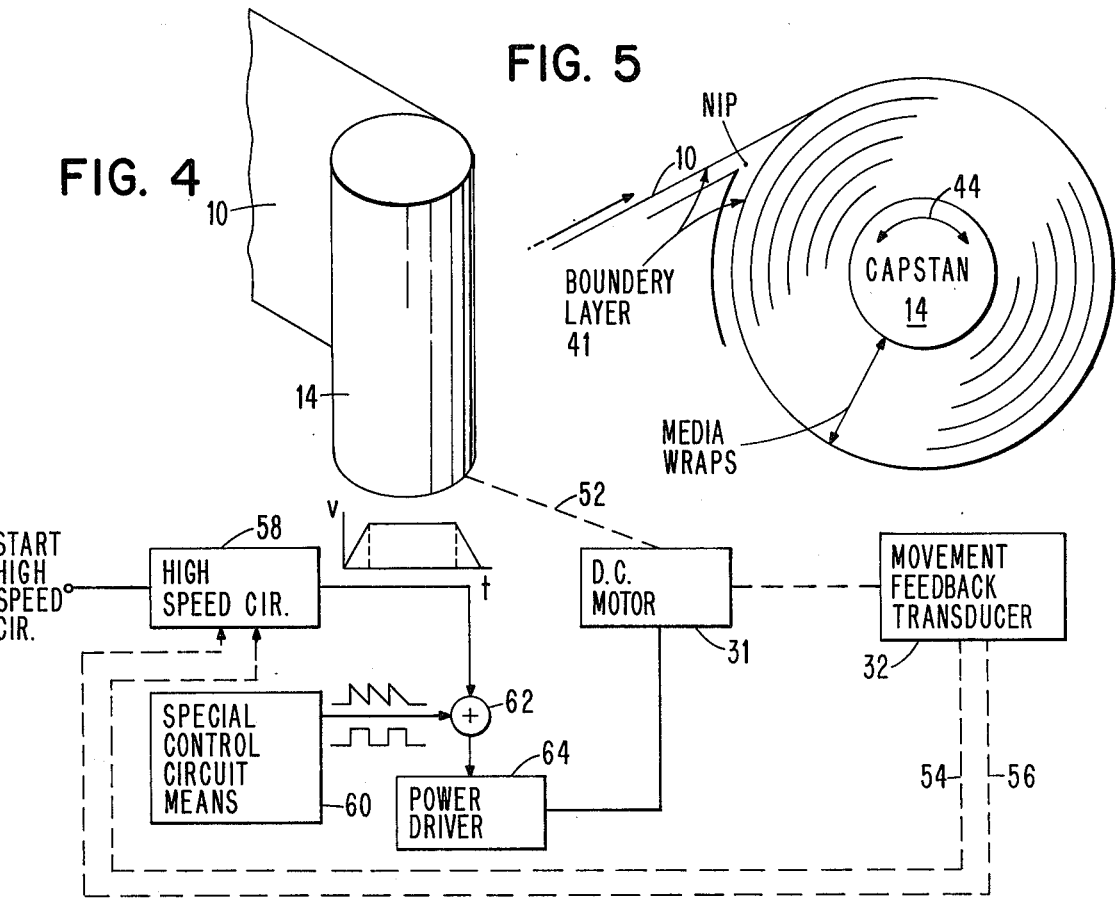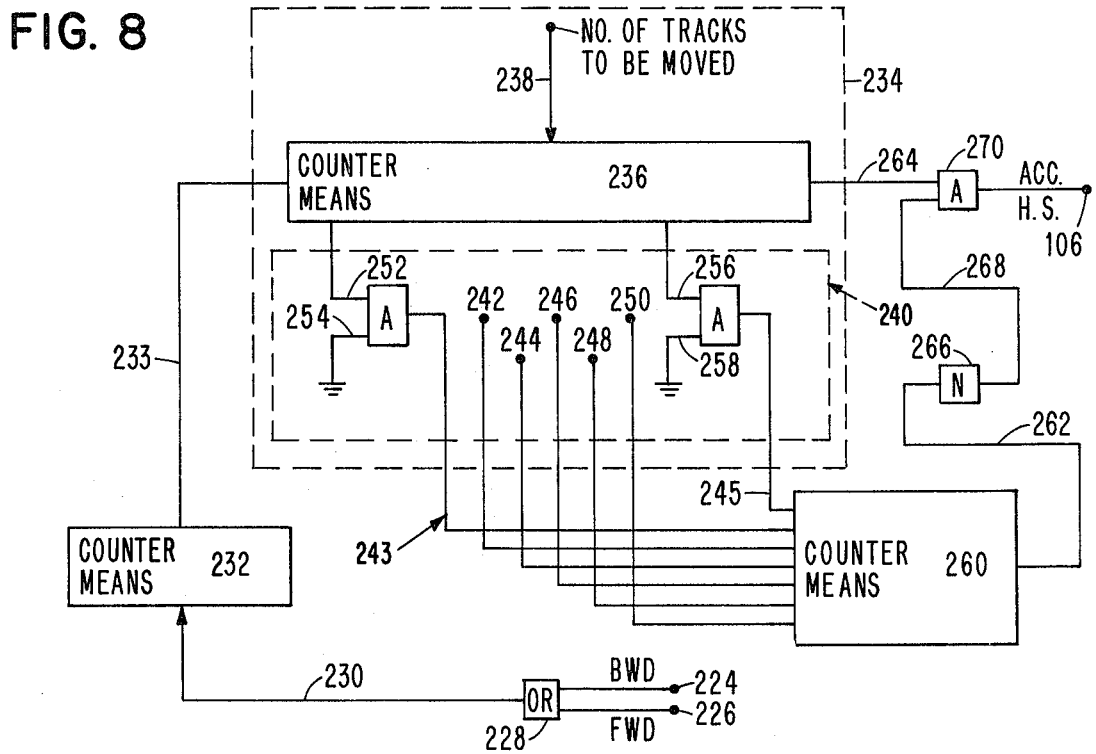

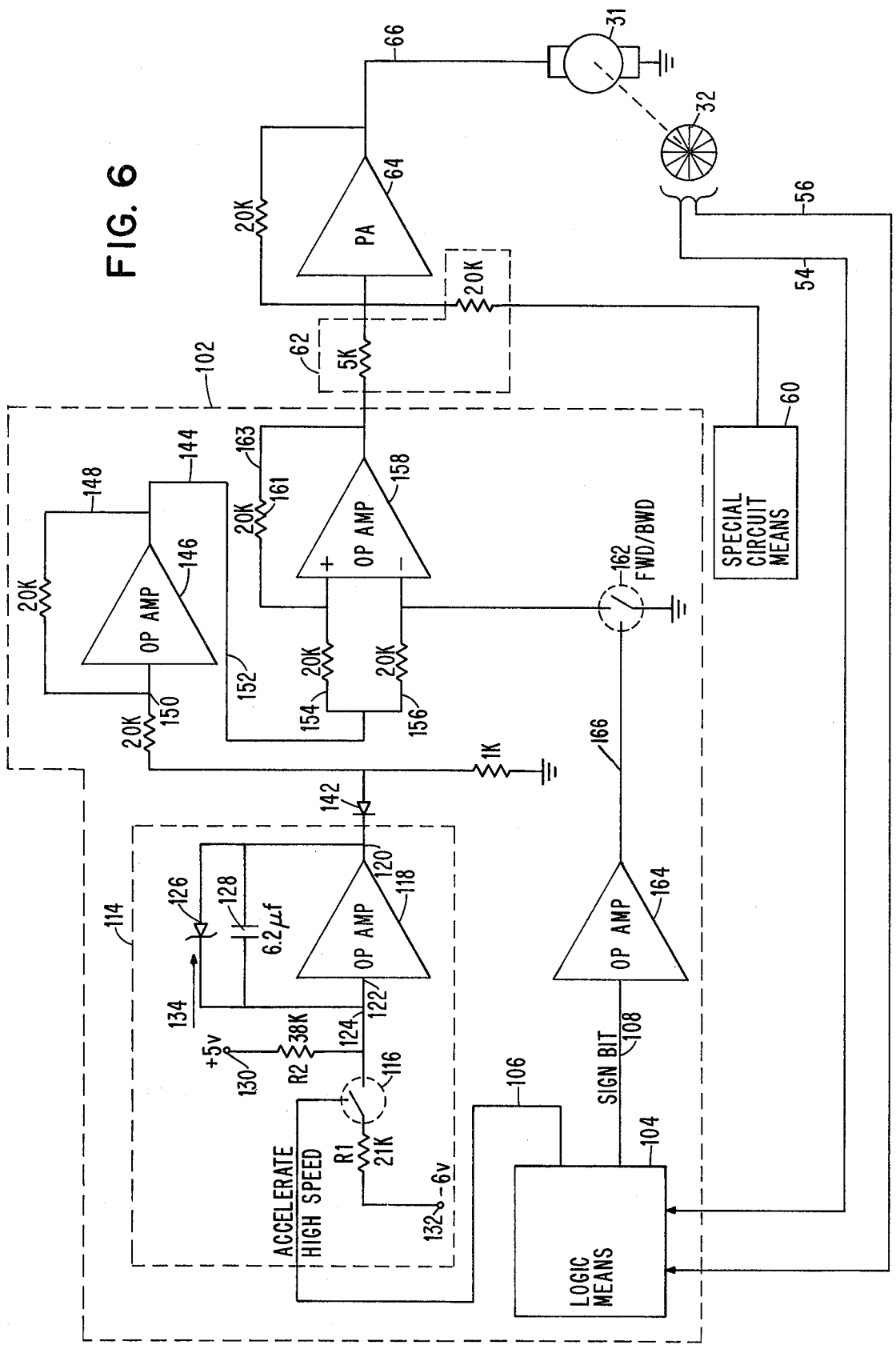

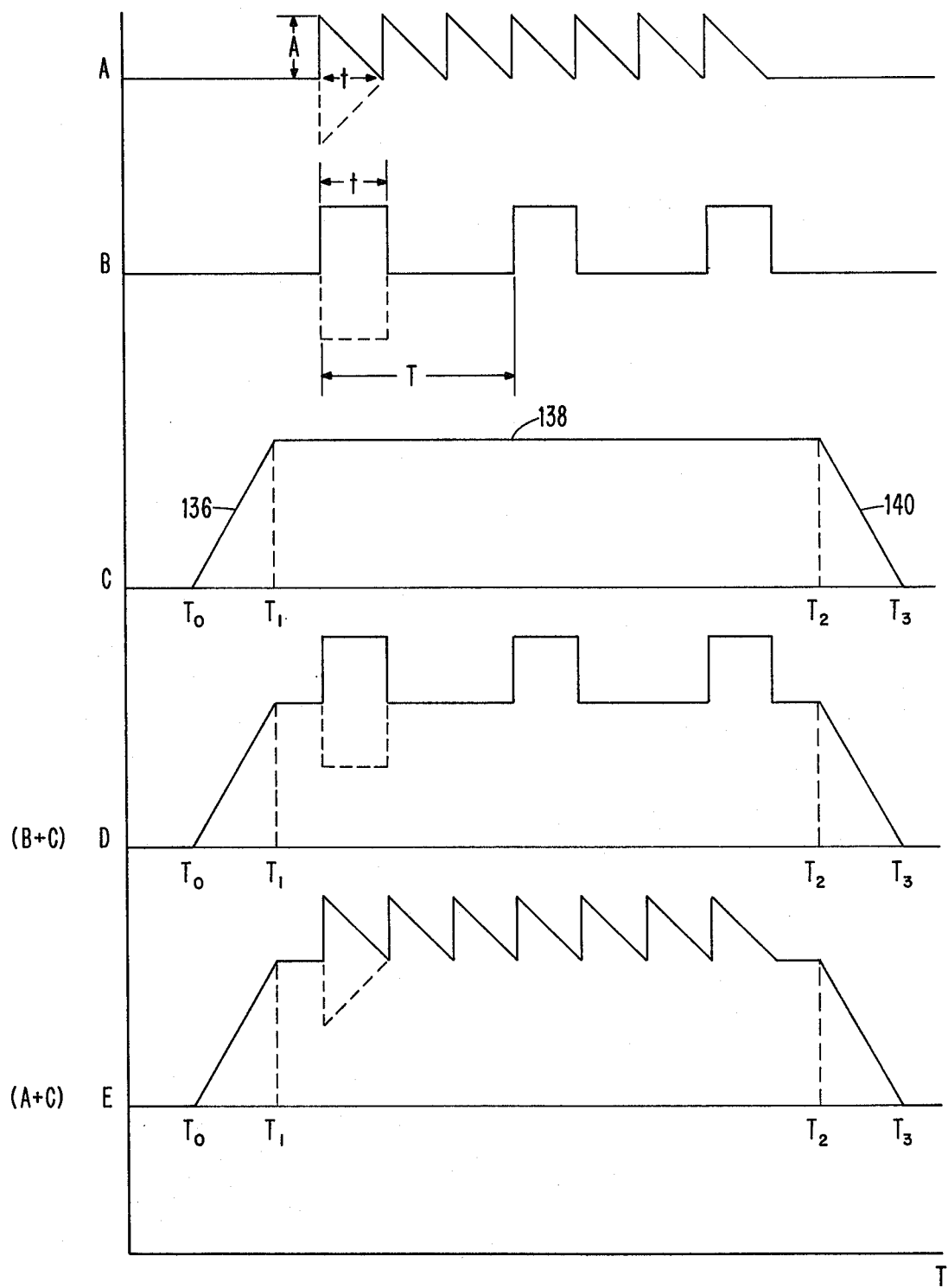

PROCEDURE FOR TIGHTENING TAPE WRAPS ON A SPINDLE

BACKGROUND OF THE INVENTION

1. Field of the Invention

This invention relates to the field of magnetic telegraphones, and more specifically to magnetic tape units employing one or more rotating heads which record and/or reproduce machine-convertible information while moving in transducing relationship with a magnetic web or tape. More specifically, the invention relates to means for controlling the magnetic web or tape to reduce interlayer slippage.

2. Prior Art

Rotating head magnetic tape units are widely known. In one form a generally cylindrical mandrel or drum includes a rotating head wheel which carries one or more read/write heads. The magnetic tape engages the mandrel at one point, makes a helical wrap about at least a portion of the mandrel and exits the mandrel at a point which is both axially and circumferentially spaced from the entrance point. The angle of helical tape wrap can vary in accordance with design choice, but is usually between 180° and 360°. The head wheel rotates so as to sweep its magnetic heads traversely across the tape. The angle at which the head enters and exits the tape may vary, in accordance with design choice, from slightly less than 90° to a small angle, such as 15°.

Another form of device is one wherein the head wheel is associated with a tape guiding structure which bends the tape traversely into an arcuate shape that conforms to the circumferential shape of the headwheel. In this device, the tape travels in a generally straight line past the headwheel, and is traversely bent by the associated guides as it enters the headwheel area.

The present invention finds utility with either aforementioned type of device, and has been found particularly useful with the helically wrapped device.

Generally, the aforementioned devices are capable of operating in two modes. The so-called high speed mode of operation and the so-called stepping mode of operation. During the high speed mode of operation, the magnetic media is transported at a relatively high speed from a supply spool to a take-up spool or capstan. The high speed mode of operation is generally used to perform a search operation. During the stepping mode of operation the magnetic media is transported at a relatively low rate of speed from the supply spool to the take-up spool. In fact, the low speed mode of operation is, generally, functional when the device is stepping between adjacent tracks.

A major problem encountered in the aforementioned devices is that of interlayer slippage (i.e. layers of tape slipping relative to one another). Generally, the interlayer slippage is generated from the high speed mode of operation. As the flexible media is wrapped or coiled onto the take-up spool or capstan, air is entrapped between the layers of convolutions. The entrapped air forms layers of air film between the layers of tape on the capstan. Due to the air film between the tape layers, friction between adjacent layers of tape is substantially reduced which results in loosely wrapped-around tape.

During low speed operation the tape is stepped from one stripe to the next. The stepping is achieved by a torque which is supplied by the capstan motor to the capstan. However, after a high speed search, due to the air film which is entrapped between the tape layers, although the capstan moves as a result of the applied torque the torque is not transmitted to each individual layer of tape. As a result of the non-transmission of torque, the tape does not step or if the tape does step the direction of motion is opposite to the direction of capstan step. Due to the interlayer slippage an incorrect stripe will be in registry with the rotating head. As is well known in the art, each stripe on the media is generally identified by a unique identification number (ID). The system keeps a log or check on the ID of the stripe which the head must access after a step operation. When the system checks and finds that the head is now in registry with the wrong stripe, the system will ultimately reject the entire tape cartridge as defective when, in fact, it is not.

A more devastating result is that occassionally the head may record new information over the information which was previously recorded in the track and, therefore, destroy valuable customer data.

The prior art has adapted several approaches to solve the aforementioned problems, none of which are acceptable in a high speed data processing environment. In the first instance, prior art systems are designed to operate at an optimum speed during high speed search. The optimum speed is selected so that air will not be entrapped between the layers of the media; or if air is entrapped only a relatively small volume which will not aggravate the interlayer slippage problem. By designing the prior art devices to operate at an optimum speed, the processing time of the overall system is significantly increased. As is well known, the current trend in high speed data processing systems is to minimize the processing time (that is time required to access information from the storage means). As such, the first approach practiced in the prior art, to solve interlayer slippage, is not acceptable.

In a second attempt to solve the interlayer slippage problem, the prior art devices are designed with a squeegee means. The squeegee means is positioned relative to the capstan on which the tape is wound. By forcing the squeegee to contact the surface of the wound tape, entrapped air is squeezed out from between the tape layers.

Although this approach is an improvement over the first aforementioned discussed solution, it suffers from several drawbacks. In order to control the contact between the take-up spool and the squeegee, both mechanical and electrical means are required for controlling the positioning of the squeegee. For example, during high speed mode of operation the squeegee cannot be in contact with either the capstan or the tape which is wound on the capstan. At the end of a high speed search the squeegee has to be forced in contact with the media or tape on the capstan. The mechanical linkage and electrical circuit which is required to control the squeegee tends to increase the overall cost of the device. Additionally, the time required for the mechanical linkage to react tends to lower the accessing time for the device. A more detailed discussion of the squeegee system is given in U.S. Pat. No. 3,309,037 wherein a squeegee means is used to squeeze out air entrapped between layers of magnetic media.

Another problem which the squeegee solution introduced is that of unusual tape wear. Due to the fact that the squeegee is in contact with the oxide surface of the media, scratches are often transferred to the media. Due to the scratches, the useful life of the media is significantly reduced.

Still another approach which is practiced in the prior art to solve interlayer slippage is backcoat roughness or substrate roughness. In this approach the backcoat or substrate of the media is roughened beyond conventional limits. The particles which are placed on the backcoat so as to create the roughened surface project into the space between adjacent layers and inhibit the formation of air film.

However, backcoat roughness as a solution to the interlayer slippage problem is effective only when the roughness is at an optimum value. If the roughness falls below the optimum value its effect in solving the interlayer slippage problem is negligible. Media whose backcoat has a roughness which is equal to or greater than the optimum range is plagued with the phenomenon known in the art as "print through". "Print through" is the phenomenon wherein adjacent layers of media are embossed as a result of the particle size which is applied to the backcoat of the media to cause its roughness. "Print through" affects the density at which data is recorded on the oxide surface of the media. This is so because as a result of the embossing the oxide surface of the media is no longer smooth; hence the magnetic transducer does not fly at a uniform height and/or relatively close to the oxide surface of the media. As is well known to those skilled in the art it is possible to have denser recording the closer a magnetic transducer flys to the oxide surface of the media.

Another problem which the "print through" creates is an increase in the frequency of head/media crashes which result in unusual head and tape wear. As the tape is embossed by the "print through" phenomenon the oxide surface of the media is covered with a plurality of mounds or projections which project above the oxide surface of the tape. As the magnetic transducer flys over the media which has a non-uniform oxide surface the transducer crashes into the mounds.

SUMMARY OF THE INVENTION

The present invention overcomes the prior art aforementioned interlayer slippage and its associated problems by a unique apparatus and a combination of process steps.

The apparatus comprises a first function generator which generates a first voltage waveform. The first voltage waveform is used to energize the capstan or take-up spool motor. The characteristic of the first voltage waveform is such that whenever it is applied to the capstan motor, media is wound on the capstan at a relatively high speed. As used herein, "high speed" means that the tape is transported past the processing station (which includes magnetic transducer) at a rate approximately equal to or greater than 100 inches per second. Alternatively, "high speed" means that the media is wound onto the capstan at a rate approximately equal to or greater than 100 inches per second.

A second voltage waveform is generated by a second function generator. The second voltage waveform includes a high acceleration component. The second voltage waveform is summed with the first voltage waveform. The composite voltage waveform is then applied to the capstan motor. Due to the characteristic, i.e. the high acceleration component of the second voltage waveform, a continual jerking action is transmitted to the media and air which is entrapped between the layers of media is squeezed out.

In one feature of the invention the second voltage generator is a generator which generates a saw-tooth voltage waveform. The saw-tooth voltage waveform is used as the second voltage waveform.

In still another feature of the invention a free running oscillator generates a square wave. The square wave is then shaped, by a wave shaping means, and is used as the second voltage waveform.

The foregoing and other features and advantages of the invention will be apparent from the following more particular description of preferred embodiments of the invention, as illustrated in the accompanying drawing.

BRIEF DESCRIPTION OF THE DRAWING

FIG. 4 shows an elevated view of the take-up capstan with tape thereon and means for controlling the capstan in accordance with the present invention.

FIG. 5 is an end view of the take-up capstan with tape thereon and is useful in explaining the problem which is solved by the present invention.

FIG. 6 shows the circuitry which generates the high speed voltage waveform.

FIG. 8 shows the detail of the logic means depicted in block diagram form in FIG. 6.

FIG. 9 shows waveforms generated by the circuit means of FIG. 7, together with the composite waveform which controls the capstan in accordance with the present invention.

DESCRIPTION OF THE PREFERRED EMBODIMENT

The present invention will be described in the environment of a rotating head magnetic tape unit. This general type of magnetic tape until transduces data from a length of magnetic tape while the tape is stationary. Specifically, magnetic tape 10, FIG. 3, includes a plurality of inclined data tracks 11 and 12 which are swept by the rotating head while the tape is stationary. Once a given data track is transduced, that is either written or read by the rotating head, the tape is incremented or stepped to an adjacent data track. Although the invention is described in a rotating head environment, this should not be regarded as a limitation on the scope of the invention since the inventive feature, as is disclosed herein, is applicable to the general situation where a flexible media or material is wound onto a spool or capstan and has to be tightened due to air which is entrapped between the layers of the flexible material.

Figure 1:
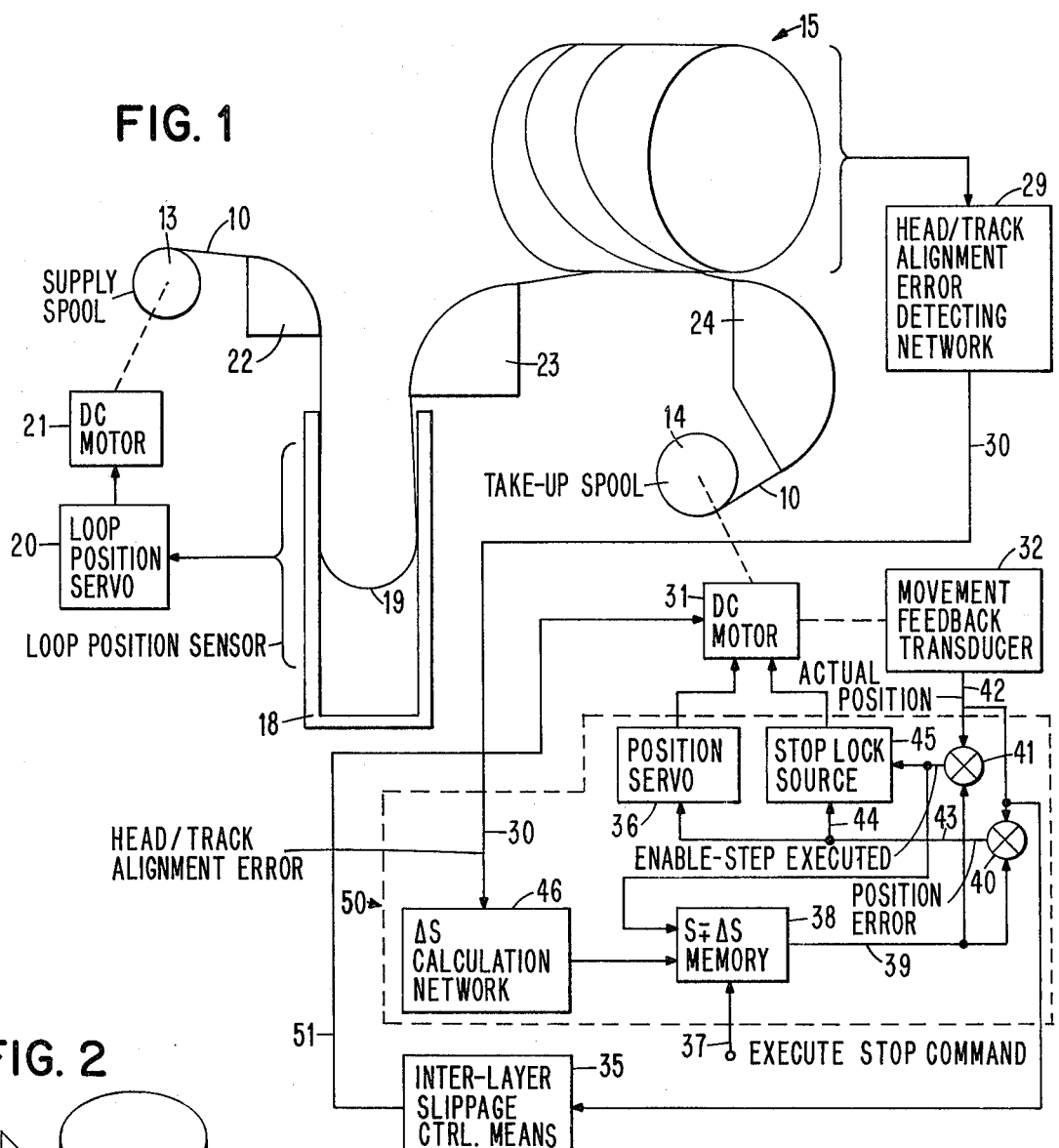
FIG. 1 is a view showing a rotating head magnetic tape unit whose take-up capstan DC motor is controlled in accordance with the present invention.

With reference to FIG. 1, a length of magnetic tape 10 extends between supply spool 13 and take-up spool 14. The tape path extending between these two spools includes transducing station 15 where a helical wrap of tape is formed about a stationary mandrel having a centrally located head wheel 16 carrying head 17, as more specifically shown in FIG. 2. The tape path includes a single tape buffer in the form of vacuum column 18. A loop of tape 19 is maintained in the vacuum column and its position is sensed by a loop position sensor (not shown). This loop position sensor, which may be of the type described in U.S. Pat. No. 3,122,332 issued to F. G. Hughes, Jr., provides an input signal to loop position servo 20 to control supply spool DC motor 21, thereby maintaining loop 19 at an optimum position as the tape moves in incremental step-by-step fashion from supply spool 13 to take-up spool 14.

Figure 2:
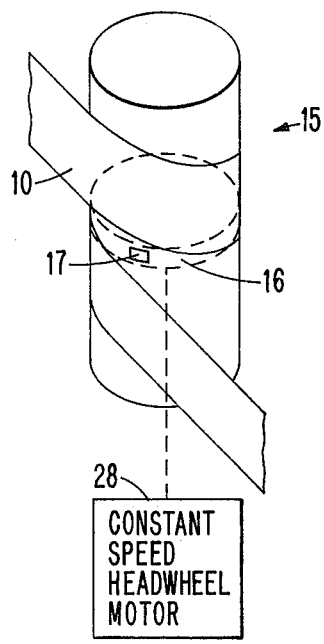
FIG. 2 is a view of the tape wrapped mandrel of FIG. 1 showing a helical wrap of tape thereabout and showing the centrally located head wheel which carries a magnetic head or transducer.

A preferred magnetic transducer or head configuration to be used as head 17 of FIG. 2, useful in establishing a stable hydrodynamic air film at the head/tape interface, is described in U.S. Pat. No. 3,821,813 filed Dec. 27, 1972 and commonly assigned.

As the tape passes through the tape path of FIG. 1, it is air bearing supported at 15, 22, 23 and 24. The side edges of the tape are preferably compliant guided but particularly at air bearings 23 and 24. By way of example, this compliant guiding may be the continuous compliant guide described in U.S. Pat. No. 3,850,358, issued to M. L. Nettles and commonly assigned.

Figure 3:
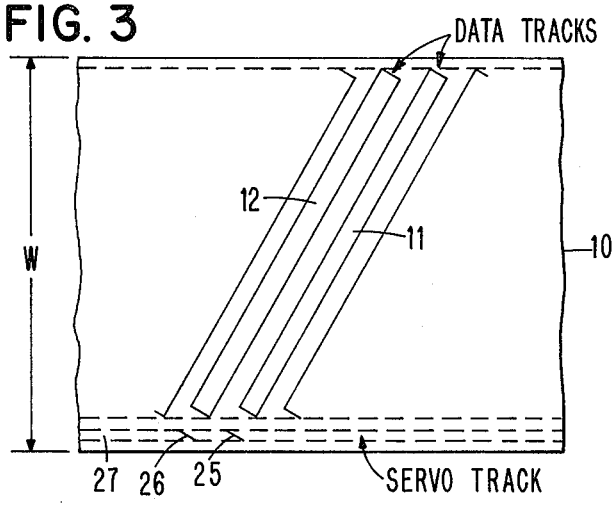
FIG. 3 is a view showing a flat section of tape with two of the many traverse data tracks thereon and two individual servo tracks indicia which identify the physical location of these two data tracks.

FIG. 3 is a view showing a flat section of tape, such as the tape section shown in FIG. 2, wherein two of the many traverse data tracks and two specific servo track indicia 25 and 26 are shown. Generally, the width of magnetic tape 10 is greater than conventional half inch tape. With wide media or tape (that is media having a width substantially greater than conventional half inch tape, approximately 2.7 inches) the problem of interlayer slippage, to which this invention is directed, is more pronounced than narrow media (that is media having a width substantially equivalent to half inch media or less). This, however, does not preclude the present invention from solving interlayer slippage problems in narrow media. Still referring to FIG. 3, indicia 25 and 26 reside in servo track 27 and serve to identify the center line of the two data tracks 11 and 12, respectively. When a section of tape is properly positioned relative to the mandrel, head wheel 16 of FIG. 2 traverses a data track in exact alignment and coincides therewith. Movement of head 17 is at a constant speed as controlled by constant speed headwheel motor 28. Although only two data tracks are shown in the embodiment of FIG. 3, in acutality the tape has a plurality of data tracks each having servo indicia for identifying and aligning head 17 with each track.

Referring again to FIG. 1, media 10 is transported by the tape transport unit at two rates of speed. The so called high speed rate or high speed mode and the so called stepping rate or stepping mode. In the high speed mode of operation, media 10 is transported past head 15 and is wound on take-up spool or capstan 14 at an approximate speed of 90 to 200 inches per second. In the so called stepping mode, the tape is stepped from one data tract to an adjacent data track. For example, in FIG. 3 the tape is stepped from track 12 to track 11 or vice versa. As will be explained subsequently, in order to control the motion of media 10 there is a specific relationship between the data tracks and the number of lines of movement feedback transducer 32 (FIG. 1). For example, in the preferred embodiment of this invention, the distance between data track 12 and 11 or any other adjacent data tracks is equivalent to 64 lines which are positioned on movement feedback transducer 32. Stated another way, whenever media 10 is stepped one track (that if from track 12 to track 11 or vice versa) movement feedback transducer outputs 64 pulses on conductor 42. Movement feedback transducer also feeds back positional and directional information. This positional and directional information is fed into interlayer slippage control means 35 where control pulses are outputted on conductor 51 and are used to control DC motor 31. As will be described hereinafter, this invention is directed at the circuitry and method used in interlayer slippage means 35 to develop the control pulses.

The exemplary showing of FIG. 3 is intended to be quite general, since the particular data field formats used in data tracks 11 and 12 and in servo track 27 are not important to the present invention. Suffice it to say that head track alignment error detection network 29 of FIG. 1 responds to the position of indicia 25 and 26 in servo track 27 to originate a head/track alignment error on conductor 30. The details of network 29 are not disclosed since this network may take many forms, in accordance, for example, with format of servo track 27. Furthermore, such a network may receive its input information either from a stationary head which reads the tape servo track 27, or alternatively this servo track may be read by the rotating head itself as it enters and/or leaves the tape. Examples of acceptable networks of this type can be found in U.S. Pat. No. 3,666,897 issued on May 30, 1972 to J. D. Harr.

Referring again to FIG. 1, the function of the servo apparatus associated with take-up spool 14 is two fold. First, servo apparatus 36 functions to step the tape incremently such that one data track is replaced by an adjacent track, and in alignment with rotating head wheel 16 of FIG. 2. Furthermore, the alignment between the tape data track and the head is servo controlled and stabilized. Secondly, servo apparatus 35 energizes DC motor 31 during the period when the system is performing a high speed search (that is media is transported between 90 to 200 inches per second).

More specifically, the head/track alignment is maintained by a servo mechanism which energizes DC motor 31 and operates to provide fine control of the tapes position. Such a network is not disclosed in FIG. 1 and may, for example, take the form disclosed in U.S. Pat. No. 3,666,897 and U.S. Pat. No. 3,864,739.

Step servo mechanism 36 controls motor 31 to increment or step the tape one data track at a time. Once the tape is stepped, head 17 transduces (that is reads or writes information from the selected data track). Once the tape is stepped, fine tape positioning is achieved by using the output of network 29. The input signal to this network is derived from the tapes servo track 27, as this servo track is read by rotating head 17.

When a command is received to move to the next data track, input conductor 37 is enabled. As a result, network 38 is effective to place a command step distance by means of conductor 39 to summing terminals 40 and 41. The magnitude of the step command is designated $S \pm \alpha S$.

A second input to junctions 40 and 41 appears on conductor 42 and is provided by the output of transducer 32. Junction 40 is effective to compare actual motor position on conductor 42 to the command position on conductor 39. As a result of this comparison, position error signal appears on conductor 43. This position error signal is applied as an input to position servo 36, thereby energizing DC motor 31 in a manner to reduce this error to zero.

Summing junction 41 also responds to the discrepancy between the motors actual position and the command position. This junction is effective to enable stop lock source 45 and memory network 38 only when the position error has been reduced substantially to zero, this state indicating that position servo 36 has completed the execution of a requested tape step. Once stop lock source 45 is enabled, it is thereafter effective to maintain motor 31 at a stable stop position. The torque of this motor now resists the force of vacuum column 18 tending to pull tape through transducing station 15 and off spool 14. In addition, network 38 is enabled to begin the calculation of a new S±ΔS to be used in a subsequent step. Since servo mechanism 50, which controls the stepping of tape 10, is not part of the present invention, the circuits of servo mechanism 50 will not be discussed further. However, a more detailed discussion of servo mechanism 50 is disclosed in U.S. Pat. No. 3,864,739 issued to Howard C. Jackson and commonly assigned.

As was mentioned earlier, the present invention is directed to control of DC motor 31 during the period when the device is doing a search function or transporting tape 10 at a relatively high rate of speed. During this period of time, servo mechanism 50 is deactivated and interlayer slippage control means 35 outputs signals on conductor 51 which controls the operation of DC motor 31.

Referring now to FIG. 4, an elevated view of the take-up capstan or take-up spool with tape thereon is shown. Take-up spool 14 is attached to DC motor 31 via shaft 52. In order to wind tape on take-up spool 14, DC motor 31 is energized. The present invention is directed to the energization of DC motor 31 during the time when tape is wound on take-up spool 14 at a relatively high speed. In order to control DC motor 31, movement feedback transducer 32 monitors the direction of rotation and the angular displacement of DC motor 31. This information is outputted on conductors 54 and 56, respectively. The output on conductors 54 and 56 are fed into high speed circuit means 58 which, in turn, generates a high speed voltage waveform, (FIG. 9C). When this high speed voltage waveform is applied to DC motor 31, the tape transport unit is forced into a high speed search. Still referring to FIG. 4, special control circuit means 60 generates a second controlled voltage waveform. This second controlled voltage waveform may take a plurality of wave shape forms. However, this second controlled voltage waveform must have a high acceleration component. As will be explained hereinafter, the high aceleration component imparts a jerking action to the capstan during the high speed search and, as a result, air which is entrapped between the layers of tape is squeezed out. The high speed voltage waveform which is generated by high speed circuit means 58 and the second voltage waveform which is generated by special control circuit means 60 is combined by summing means 62. The output from summing means 62 is then fed into power driver means 64 and is then applied to the DC motor.

Turning, for the moment, to FIG. 5 an end view of capstan 14, with media 10 thereon, is shown. This view is helpful in understanding the problem to which the present invention is directed. As is shown in the figure, capstan 14 rotates in either direction, as is shown by arrow 44. For explanation purposes, assume that capstan 14 is rotating at high speed clockwise. As the capstan rotates, media is wound thereon. As media 10 is wrapped on the capstan, air becomes trapped between the layer of wraps. Boundary layer of air 41 adheres to both surfaces of tape converging to the Nip. When the media is wound past the Nip, the air is entrapped. At some time later the air bleeds out from between the wraps, thus causing "loose" wraps which results in low interlayer pressure and low layer-to-layer friction. Torque which is applied by capstan motor 31 during a step operation (which generally follows a high speed search) cannot be transmitted through the loose wraps and interlayer slippage hereinafter called "cinching" occurs.

Referring now to FIG. 6, the analog and digital circuits which control DC motor 31 in accordance with the present invention is shown. Drive means 31 is energized by voltage waveforms generated by high speed loop 102 and special control circuit means 60. The waveforms which are outputted from high speed loop 102 is combined with the waveform which is outputted from oscillator and special circuit means 60 via summing means 62. The output from summing means 62 is fed into power driver 64. In the preferred embodiment of this invention, power driver means 64 is a power amplifier. The power amplifier then outputs a control signal on conductor 66 which is used for energizing DC motor 31.

High speed loop 102 comprises of wave shaping means 114. Wave shaping means 114 is interconnected via first switch means 116 to conductor 106. Switch means 116 is a conventional electronic switch; for example, a transistor switch. However, other types of switches can be used by one skilled in the art without departing from the scope of this invention. As will be explained in the operational section, whenever high speed loop 102 is active, DC motor 31 is placed in the high speed mode of operation hereinafter called the search mode. In the search mode, the tape is wound at a speed greater than 90 inches per second.

Wave shaping means 114 includes operational amplifier 118, hereinafter called OP AMP 118 with output terminal 120 and input terminal 122. The input terminal is interconnected via conductor 124 to switch means 116 and a parallel combination of resistive means identified as $R_1$ and $R_2$, respectively. Both $R_1$ and $R_2$ are tied to motor supply means 130 and 132, respectively. Although $R_1$ and $R_2$, with their respective voltage supply means are assigned values, these values should be regarded as representative, since it is within the skill of the art to change these values and/or configurations without departing from the scope of this invention. Positioned in parallel with operational amplifier 118 are voltage clamping means 126 and capacitive means 128. In the preferred embodiment of this invention, the voltage clamping means is a zenner diode with a clamping voltage value of 6 volts. When high speed loop 102 is inactive, switching means 116 is closed. With switching means 116 closed, current is pulled from positive supply means 130 through $R_1$ and $R_2$ to negative supply means 132. With conductor 106 active (that is a pulse is generated by logic means 104), switch means 116 opens. With switch means 116 open, the direction of current flow is reversed. This means that current is pulled through R2, along conductor 124 and this current begins to charge capacitor 128. The direction of charge is in the direction shown by arrow 134. As the charge on the capacitor builds up, ascending ramp, 136 is generated (FIG. 9C). The ramp will cease its ascending characteristics when the voltage (that is the charge on capacitor 128 is substantially equivalent to the voltage on zenner diode 126). In the preferred embodiment of this invention, the voltage is equivalent to 22 volts. This means that when ramp 136 approaches the 22 volt level the voltage will remain constant until a specific time $T_2$ (FIG. 9C). Between time $T_1$ and $T_2$, section 138 of the high speed voltage waveform which is applied to drive means 31, is generated. As will be explained subsequently, it is during this time period that the control pulses shown in FIGS. 9A and 9B is impressed on the high speed voltage waveform to create the jerking action which squeezes out air entrapped between layers of tape. Still referring to FIG. 6 and FIG. 9, the time $T_2$ is determined by logic means 104. As $T_2$ is approached, logic means 104 deactivates the signal which appears on conductor 106. With the signal on conductor 106 inactive, switch means 116 is now closed and capacitor 128 is being discharged via $R_1$. With capacitor 128 discharging, ascending ramp 140 is generated. The net effect is that wave shaping means 114 generates a waveform which has a somewhat trapezoidal shape and, when applied to DC motor 31, a high speed search is generated.

The signal of terminal 120 is fed to blocking or non inverting means 142. In the preferred embodiment of this invention, blocking means 142 is a conventional diode. The diode will prevent the output signal, terminal 120, from changing in any way. The signal, which is generated by wave shaping means 114, is then supplied to converting means 144 via blocking means 142. Converting means 144 includes operational amplifier 146 with the feedback path 148 and input terminal 150. Any signal having a specified waveform which is supplied to inverting means 144, is inverted and is outputted on conductor 152. The signal on conductor 152 is fed via conductors 154 and 156, respectively, to operational amplifier 158.

The output signal from operational amplifier 158 is fed to summing means 62. The output terminal of operational amplifier 158 is tied to input terminal 154 via feedback loop 163 and associated resistive means 161. The terminal 156 is connected to second switch means 162. Second switch means 162 is either closed, which signifies that DC motor 31 is moving forward or open, which indicates that driving means 31 is moving backwards. BY closing or opening switch means 162, the characteristics of the ouput signal, which is fed into summing means 62, changes. Of course, the designation of close, representing forward motion while open represents backward motion, may be defined in an alternative fashion without departing from the scope of the present invention. As will be explained subsequently, the control for second switch means 162 is outputted on conductor 108 from logic means 104. The signal is then amplified by OP AMP 164 and is outputted on conductor 166 for controlling second switch means 162.

Referring now to FIG. 8, the details of logic means 104 is shown. Movement feedback transducer 32 (FIG. 6) outputs pulses on conductors 54 and 56, respectively. Logic means 104 receives the pulses and generates a backward pulse which appears on conductor 224 or a forward pulse which appears on conductor 226. The signal is then fed into a conventional "OR" circuit means 228 which, in turn, outputs a signal on conductor 230. The signal on conductor 230 is a plurality of pulses depending on whether drive means 31 is moving backwards or forward. As the pulses are outputted on conductor 230, they are counted by the first counter means 232. In the preferred embodiment of this invention, the first counter means 232 is a conventional 64 bit counter. Counting means 232 outputs a pulse on conductor 233 whenever counter means 232 counts 64 input pulses. As was explained previously, the magnetic media, which is transported by drive means 31, comprises a plurality of inclined data tracks. The spacing between adjacent data-tracks is equivalent to an average variable of 64 tachometer pulses. This being the case, when first counting means 232 has a count of 64 tachometer pulses the magnetic media is incremented approximately one stripe past the recording transducer and the total number of stripes which the tape has to be moved is decremented by one.

In order to decrement the total number of stripes by one, logic control means 234 is interconnected to first counter means 232 via conductor 233. Decrementing logic control means 234 includes second counting means 236. The capacity of second counting means 236 is substantially equivalent to the number of stripes on the magnetic media. Loading of second counting means 236 is done via control terminal 238. As will be explained subsequently, if the magnetic media has to be moved 6,000 stripes past the rotating head, then 6,000 would be loaded via terminal 238 in second counting means 236. With the desired number of stripe loaded into counter means 236 the output from each cell of the counter is connected to compare means 240. Compare means 240 includes a plurality of "AND" circuit means, only two of which are shown in the accompanying drawings. It should be noted that the number of "AND" circuit means which comprise compare means 240 is substantially equivalent to the number of cells in counter means 236. For example, if counter means 236 is a 7 bit counter then the number of "AND" circuit means is 7. Each "AND" circuit means comprises two input terminals and a single output terminal. Terminal 242, 243, 244, 245, 246, 248, and 250 are examples of output terminals while terminal 252, 254, 256, and 258 are representative of input terminals. Each "AND" circuit means of compare means 240 has a logical (0) attached to one of its inputs while the other input is tied to one of the respective bit or cell positions of counter means 236. With this configuration as a pulse arrives on terminal 233, which signifies that drive means 31 has moved the tape, one stripe, second counter means 236 is decremented by one. The output from the decremented cell is fed to one of the "AND" circuits in compare means 240. The outputs from compare means 240 is fed into third decode means 260. In the preferred embodiment of this invention, decode means 260 is equivalent to a count of 512. This being the case, whenever the count is counting means 236 is equivalent to 512 the output from decode means 260 which appears on conductor 262 is active. Simultaneously, the signal on conductor 264, which is outputted from counting means 236, is also active from time of stripe count input to counter 236. The signal on terminal 262 is applied to inverting means 266. The output from inverting means 266 is then fed by conductor 268 to "AND" circuit means 270. With the input signals on conductor 264 and 268, active "AND" circuit means 270 is active and outputs a signal called "Accelerated High Speed on Terminal 106". The signal on terminal 106 will open first switch means 116. The signal on terminal 106 will be active until the count is counting means 260 is equivalent to 512. With the count being 512, the signal on conductor 262 becomes active. This signal is inverted by inverting means 266 and is outputted on terminal 268. With terminal 268 inactive, the output on terminal 106 changes state and first switch means 116 is closed. With the first switch means 116 being closed, the decelerating portion 140 (FIG. 9C) of the high speed voltage waveform is generated.

Figure 7:
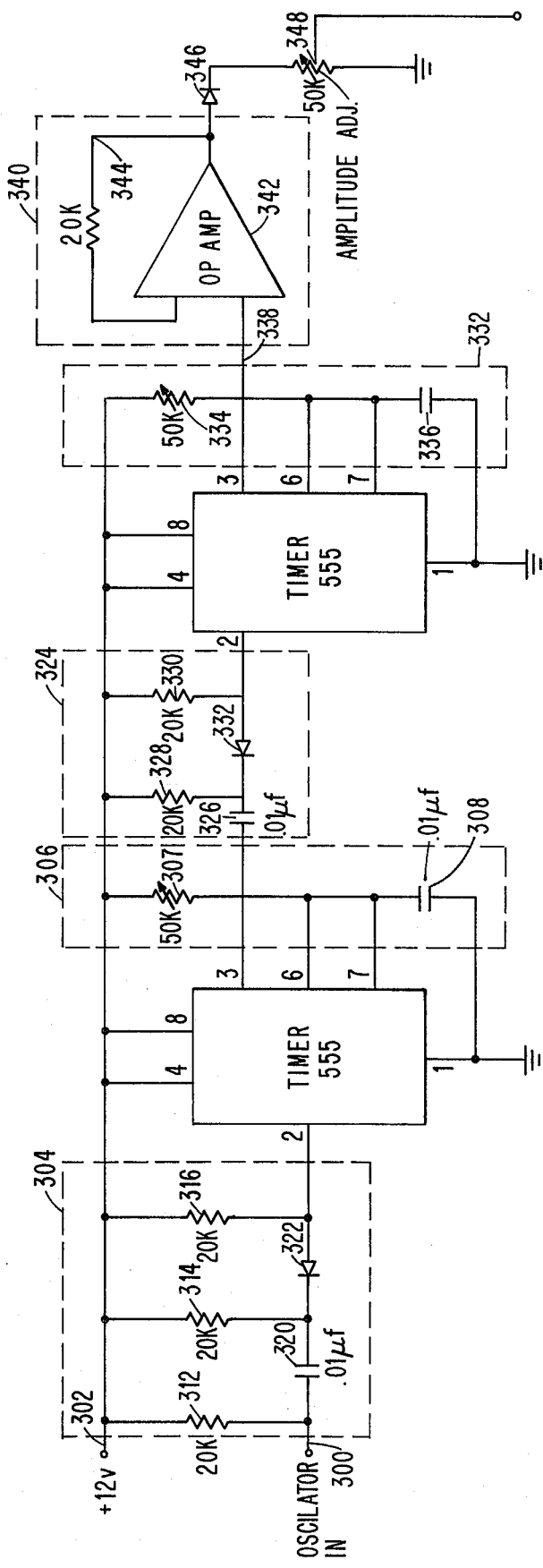
FIG. 7 depicts the circuit means which generates the control waveforms in accordance with the present invention.

Referring now to FIG. 7, the details of special control circuit means 60 (FIG. 6) which generate the voltage waveform which is combined or impressed on the high speed waveform is shown. As was stated, a plurality of voltage waveforms having the characteristics essential to tighten the tape on the capstan can be generated. However, in the preferred embodiment of this invention, two types of voltage waveforms prove to be more advantageous. The first type of voltage waveform is the saw-tooth waveform (see FIG. 9A). This saw-tooth waveform has a high acceleration portion, followed by a gradual deceleration portion. As is shown in FIG. 9A, either the positive portion of the saw-tooth identified with solid lines, or the negative portion identified with broken lines can be used. Although any saw-tooth wave form would satisfy the requirement for the present invention, it was determined that the best result was obtained when the duration of the pulse $t$ is approximately equal to one quarter the time for a complete capstan revolution. In the preferred embodiment of this invention, the time T for a complete capstan revolution is approximately equal to 28 milliseconds and $t$ was made equal to 7 milliseconds. It was also shown that the best result was obtained when the amplitude was approximately equal to 10 volts.

The saw-tooth pulse is generated by the circuit shown in FIG. 7. As is shown in FIG. 7, the output of a conventional square wave oscilator is fed onto conductor 300. A positive voltage supply is then tied to power supply line 302. The first coupling means 304 then couples the input of the oscillator and the power supply to the first timer means identified as the "555 Timer". The "555 Timer" is a conventional timing package which will accept power and oscillator input from external sources and output voltage level at a predetermined frequency. In order to delay the beginning of the ramp, first delay means 306 is interconnected to terminal 1, 6 and 7 of the "555 Timer". The first delay means 306 includes capacitive means 308 connected in series with variable resistive means 307. The first coupler means 304 is connected to terminal 2 of the "555 Timer". The first coupler means, 304, includes resistors 312, 314 and 316. The resistors have a common node on power supply line 302. With capacitive means 320, position in series with resistor 312 and 314 while diode means 322 is positioned in series with resistor 314 and 316. As was stated, coupler means 304 couples the input of the "555 Timer" to both power and the output from the free running oscilator. First delay means 306, with its variable resistor 307 and capacitor, 308, is used to delay the beginning or the acceleration portion of the ramp. The output is then fed to terminal 3 and is coupled by second coupling means 324 to a second "555 Timer".

The second "555 Timer" operates in a manner equivalent to the first "555 Timer". The second coupling means 324 includes capacitor 326 connected in series with resistor 328, which is tied to a common node with resistor 330 and diode 332 is positioned in series with resistors 328 and 330. The output from the second "555 Timer" is then fed into a second delay means 332. The second delay means 332 includes a resistive means 334 connected in tandem with a capacitive means 336. This second delay means operates to shape the deceleration portion of the saw-tooth.

The saw-tooth signal, which is now a voltage, is outputted on conductor 338. It is then fed into converting means 340 which changes the voltage waveform to a current waveform. Converting means 340 includes OP AMP 342 with its output tied to its input via feedback loop 344. The current waveform is then fed via diode 346. This diode prevents any phase reversal in the current waveform. The amplitude of the current waveform is then adjusted by adjusting means 348, from which it is fed into summing means 62.

In an alternative embodiment of the invention, a square way was used as the control waveform. In this embodiment, the output from the free running oscillator was fed into converting means 340 where it was converted to a square waveform. The amplitude of the square wave was then adjusted by amplitude adjusting means 348 from which it is fed into the summing means.

FIG. 9 shows the waveform which is generated and is used for controlling DC motor 31. In FIG. 9A, the saw-tooth waveform is shown. This waveform is impressed, or combined with the high speed waveform shown in FIG. 9C. The composite waveform is shown in FIG. 9E. Likewise, FIG. 9B depicts a square voltage waveform. The square voltage waveform is impressed on the high speed voltage waveform shown in FIG. 9C to form the composite waveform shown in FIG. 9D. When either of the composite waveforms shown in FIG. 9D or 9E is applied to DC motor 31, a jerking action is imparted to tape 10 and any air which is entrapped between the tapes layer is squeezed out.

OPERATION

As was stated, this invention allows media 10 to be wound on take-up spool 14, free of interlayer slippage. In order to achieve this end, a high speed voltage waveform shown in FIG. 9C is generated by wave shaping means 114. This high speed voltage waveform is fed into summing means 62. A second controlled waveform, having a high acceleration portion is generated. Two waveforms which are representative of the second voltage waveform is shown in FIGS. 9A and 9B. The second controlled voltage waveform is then fed into summer 62 to form a composite waveform which is shown in FIGS. 9D and 9E. The composite waveform is then fed to power amplifier 64 and then to DC motor 31. Although the waveform in FIGS. 9A and 9B may be impressed on the high speed voltage waveform (FIG. 9C between time $T_0$ and $T_3$, the best result was obtained during the time period $T_1$ and $T_2$. Stated another way, the best result is obtained when the control voltage is impressed on the high speed voltage waveform when DC motor 10 is running at its maximum steady state speed. This ends the detailed discussion of the invention.

While the invention has been particularly shown and described, with reference to preferred embodiments thereof, it will be understood by those skilled in the art that various changes in form and details may be made therein without departing from the spirit and scope of the invention.

What is claimed is:

1. In a tape transport device wherein a length of flexible magnetic media is transported past an information processing station from a supply reel to a take-up reel, the improvement comprising in combination:
    take-up reel;
    drive means, operably connected to said take-up reel, for winding said media thereon;

first control means operable, for generating a first voltage waveform to enable the transporting of said tape at relatively high velocity;

second control means, operable, for generating a second voltage waveform; said second waveform having a high acceleration component; and means, operably associated with said drive means, for combining the first and the second waveform and imposing a composite waveform to said drive means whereby a jerking motion is being imparted to said media leaving it tightly wound.

2. Apparatus for winding flexible material to alleviate interlayer slippage comprising in combination:

a length of the flexible material;

take-up means for winding the flexible material thereon;

drive means for rotating said take-up means;

power means for controlling the flow of power to said drive means;

first wave shaping means for generating a first voltage waveform to energize said drive means;

monitoring means, associated with said first wave shaping means, to monitor angular displacement and direction of motion of the drive means;

second wave shaping means to generate a second voltage waveform; said second voltage waveform having a high acceleration component;

means for combining the first and the second waveform to form a composite waveform for driving said power means.

3. The device claimed in claim 2 wherein the monitoring means is a tachometer.

4. In a rotating head magnetic tape transport unit, magnetic media is being transported from a supply spool via guides and a vacuum column to a take-up spool; the improvement comprising in combination:

means for rotating the take-up spool so as to wind the media thereon;

first control means for generating a first waveform;

second control means for generating a second voltage waveform; said second voltage waveform having a high acceleration component;

means for combining the first and second waveform; and means for applying the composite waveform to the rotating means whereby air entrapped between layers of said media is being squeezed out leaving said media tightly wound.

5. The device as claimed in claim 4 wherein the rotating means is a DC motor.

6. The device as claimed in claim 4 wherein the first control means includes a high speed voltage generating means; said voltage generating means comprising:

an operational amplifier having an output and an input;

storage means being positioned in parallel with said operational amplifier, clamping means operably connected in parallel with said storage means;

switch means associated with said operational amplifier, said switch means being operable to generate a high speed voltage waveform having an accelerating section, a steady state section and a decelerating section; and logic means for controlling said switch means.

7. The device claimed in claim 6 wherein the storage means is a capacitor.

8. The device claimed in claim 6 wherein the clamping means is a diode.

9. The device claimed in claim 4 wherein the second control means includes:

an oscillating means for generating waveforms; and shaping means for shaping said waveforms and outputting a square pulse train whereby the amplitude of each pulse being in a ratio substantially equivalent to one half the amplitude of the first waveform and the duration of each pulse being proportional to the time for one capstan revolution.

10. The device claimed in claim 4 wherein the second control means includes:

oscillator for generating pulses; and circuit means for receiving said pulses and outputting saw-tooth pulses.

11. The device claimed in claim 10 wherein the amplitude of the saw-tooth pulse is being proportional to the amplitude of the first voltage waveform and the duration of the pulse is being proportional to the time for one capstan revolution.

12. The device claimed in claim 4 wherein the combining means is a summing circuit.

13. The device claimed in claim 4 wherein the applying means is a power amplifier.

14. Method for winding flexible media on a spindle so as to eliminate interlayer slippage comprising:

generating a first high speed voltage waveform;

generating a second controlled voltage waveform; said controlled voltage waveform having a high acceleration component;

combining said first and said second waveform to form a composite waveform; and applying the composite waveform to said spindle whereby a jerking action is being imparted to the flexible media to squeeze out entrapped air.

15. Method for winding magnetic media onto the take-up capstan of a rotating head device comprising the following steps:

generating a first voltage waveform; said first voltage waveform having characteristics so as to impart high velocity to said take-up capstan;

generating a second voltage waveform; said second voltage waveform being a plurality of square pulses;

converting said first and second voltage waveform to current waveform;

combining the current waveform to form a composite current waveform, and applying said composite waveform to the take-up capstan.

16. Method for winding magnetic media onto the take-up capstan of a rotating head device comprising the following steps:

generating a first voltage waveform; said first voltage waveform having characteristics so as to impart high velocity to said take-up capstan;

generating a second voltage waveform; said second voltage waveform being a saw-tooth wave;

converting said first and second voltage waveform to current waveform;

combining the current waveform to form a composite current waveform; and applying said composite waveform to the take-up capstan.

* * * * *